Patented Apr. 10, 1951

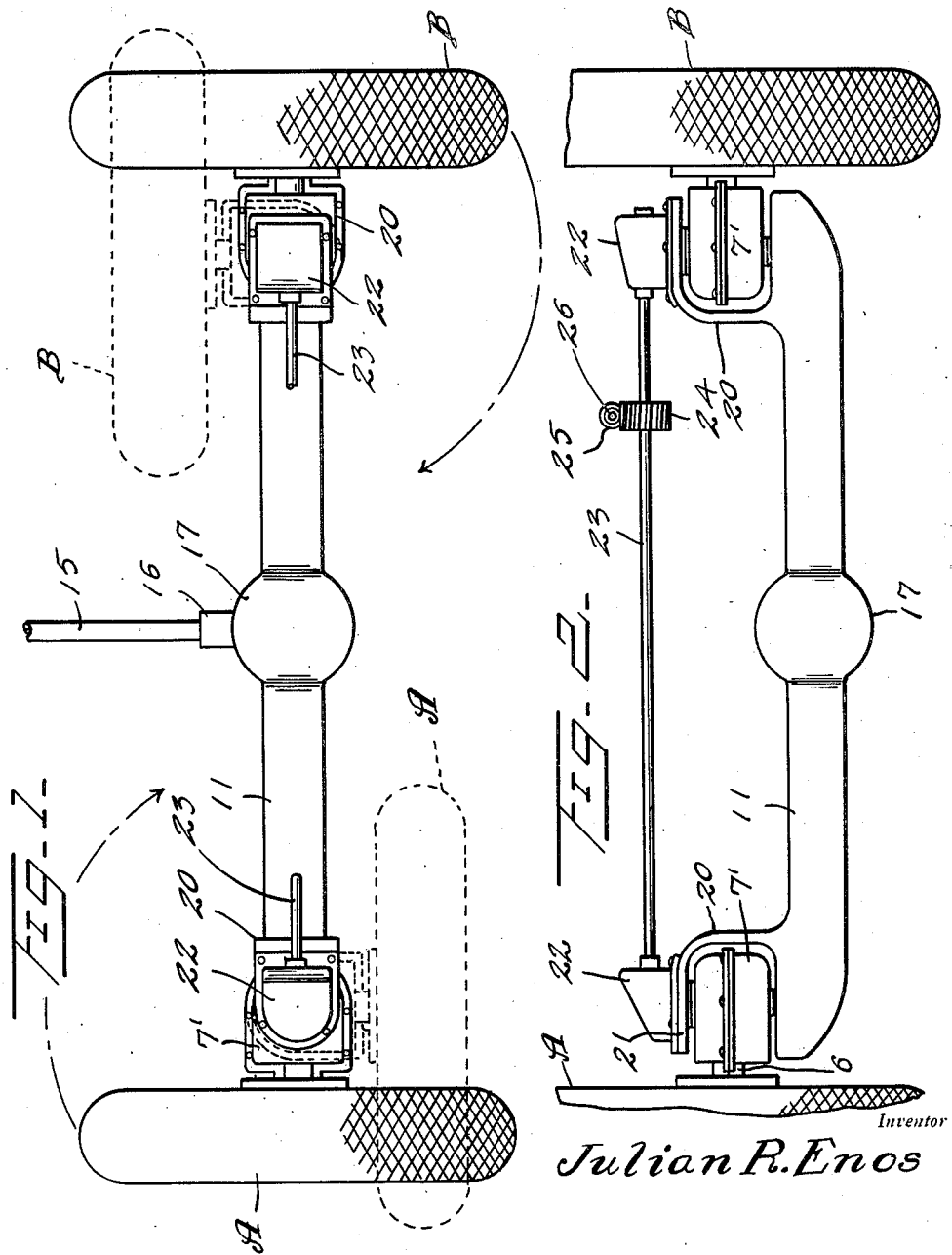

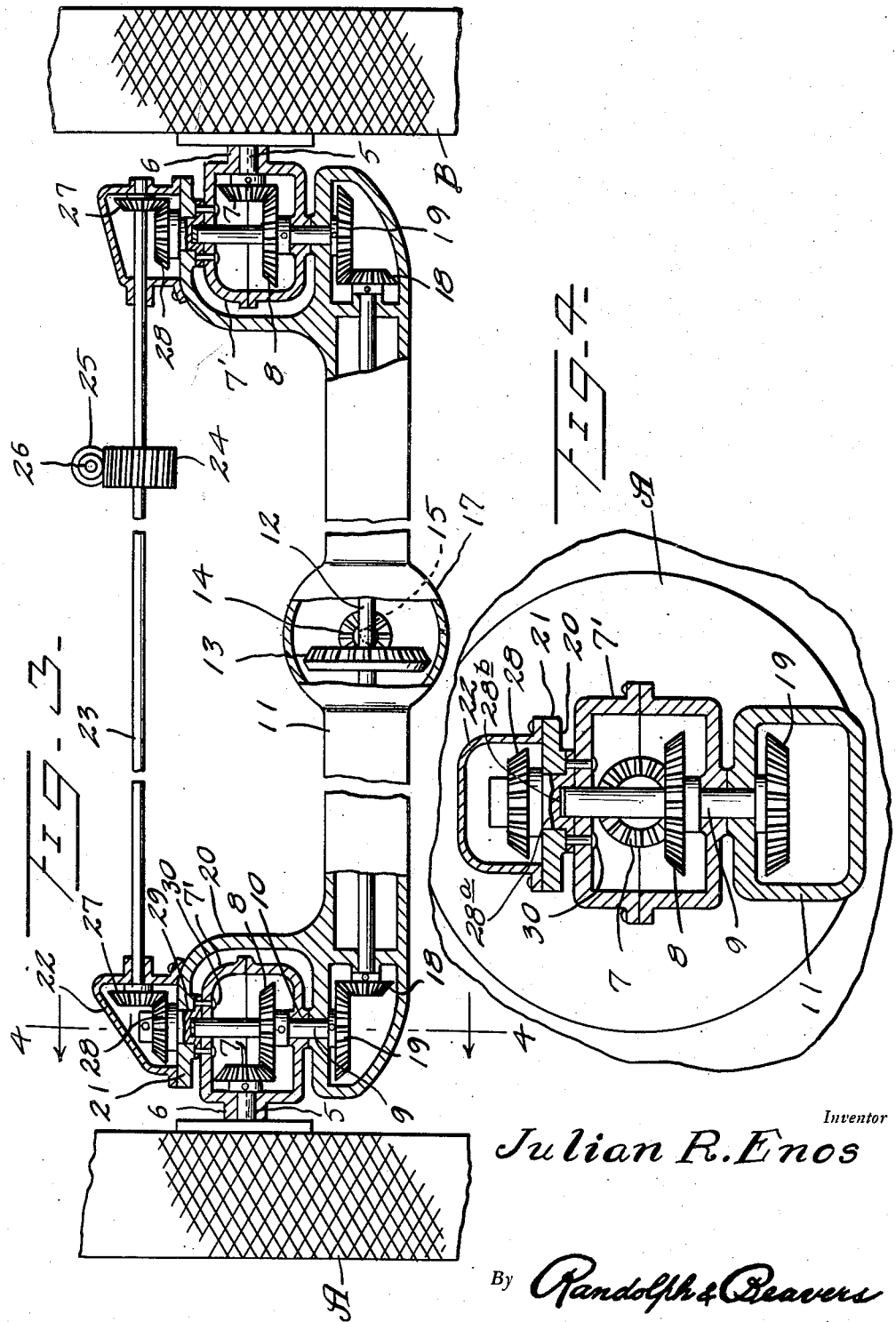

2,548,356

UNITED STATES PATENT OFFICE 2,548,356

FRONT WHEEL DRIVE

Julian R. Enos, San Luis Obispo, Calif.

Application October 25, 1946, Serial No. 705,781

1 Claim. (Cl. 180—43)

This invention relates to front wheel drives for automobiles and various vehicles and in a slightly modified form may be used in conjunction with marine craft.

The principal object of the present invention is to provide a front wheel drive and steering mechanism, the steering mechanism being so constructed and arranged as to permit sharp turning of the front wheels, which is especially desirable when parking in limited parking spaces.

Another important object of the invention is to provide a front wheel drive, certain portions of which are inter-related with a special steering mechanism whereby the front wheels can be turned in the usual steering operation without affecting power delivery thereto.

A further object of the invention is to provide a combined front wheel drive and steering mechanism wherein moving parts and bearings are minimized and wherein other details are simplified, to not only reduce the cost of manufacture, but also the susceptibility to the ready development of defects.

These and other important objects and advantages of the invention will become apparent to the reader of the following description.

In the drawings:

Figure 1 is a top plan view showing the front wheel drive and in broken lines showing the extent to which the front steerable wheels can be turned.

Figure 2 is a fragmentary front elevational view of the front wheel drive and steering mechanism.

Figure 3 is a fragmentary enlarged vertical sectional view through the front wheel drive and steering mechanism.

Figure 4 is an enlarged vertical sectional view taken on line 4—4 of Figure 3.

Referring to the drawings, reference characters A, B denote the front steerable wheels of an automobile or other motor powered vehicle and each has an axle shaft 5 extending inwardly and through a bearing 6 of a sectional housing 7'. Each stub shaft 5 has a bevel pinion 7 at its inner end and located within the corresponding housing 7', where it meshes with a bevel gear 8 on a corresponding vertical shaft 9, the lower end of the shaft being journaled through a bearing 10 in the bottom of the housing 7' and downwardly through the top end portion of an elongated shaft housing 11, which extends from one wheel A to the other wheel B.

Extending longitudinally in the shaft housing 11 is a shaft 12, which at its mid point is equipped with a bevel gear 13 meshing with a bevel pinion 14 on a drive shaft 15, the drive shaft 15 being disposed through a bearing 16 at the rear side of an enlargement 17 of said housing 11. Thus the shaft 12 is driven by the motive power of the particular vehicle and each end of the shaft 12 has a bevel pinion 18 for mesh with a bevel gear 19 on the lower end of the corresponding vertical shaft 9.

Rising from a point inwardly of each end of the elongated housing 11 is a bracket 20 which has an inwardly curved arm 21 at its upper end for supporting a housing 22 having an inclined top. A shaft 23 is located in vertical spaced parallel relation with respect to the housing 11 and has a gear 24 at a medial point with which a worm 25 on a shaft 26 meshes, this shaft 26 being connected with the usual steering wheel of the particular vehicle. (Not shown.)

The opposite ends of the shaft 23 are journaled through bearings on the housing 22 and project into the said housings where they are provided with bevel pinions 27 meshing with bevel pinions 28.

As can be seen in Figures 3 and 4, the gears 28 have stub shafts 28a recessed as at 28b to receive the upper ends of the vertical shafts 9. These stub shafts 29 are flanged and secured by bolts or rivets 30 to the top of the corresponding rotatable housing 7.

In the operation of this mechanism, it can be seen that when power is being delivered by the drive shaft 15, the pinion 14 turns the gear 13 and the shaft in turn operates the gears 18, 19, with the result that the vertical shafts 9 are rotated and this motion is imparted to the corresponding wheels A, B by the gears 8, 7, which are located within the corresponding steering housing.

With the vehicle moving, as when parking, the wheels A, B can be steered and actually turned 180°, as shown in Figure 1 in broken lines.

This is accomplished by the usual steering wheel, which actuates the steering shaft 26 and by means of the gears 25, 24, the shaft 23 is actuated, this in turn rotating the gears 27, 28. The gears 28 in rotating carry with it, the housings 7' which actually carry the wheels A, B. As the gears 28 rotate, the housings 7' are likewise rotated and can be moved to substantially the position shown in broken lines in Figure 1 so that a vehicle can be parked in a very limited parking space. The steering mechanism, thus operated, will not interfere with the drive to the front wheels by way of the gears 8, 7, as the pinions 7 will simply ride on the bevel gears 8 as the housings 7' are rotated.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A front wheel drive and steering mechanism for vehicles comprising a pair of wheels, an elongated housing interposed between the wheels, a drive shaft extending into a medial part of the housing, a shaft extending longitudinally in the housing and provided with a gear connection between the same and the drive shaft, upstanding rigid yokes on the ends of the housing, countershafts rising from the ends of the housing, meshing gears between the ends of the first mentioned shaft and the lower ends of the countershafts, a gear box mounted on the upper portion of each yoke, a gear housing disposed within each yoke and through which the corresponding countershaft is disposed, a stub shaft rotatably mounted within the upper portion of each yoke and provided with a gear at its upper end, the lower end of each stub shaft being recessed to receive the upper free end of the corresponding countershaft, said stub shafts being positively secured to the upper portions of the gear housings, said yokes being of hollow construction, each of the wheels being provided with an axle projecting into the corresponding gear housing and provided with a gear, a gear on each of the countershafts, within the corresponding gear housing and meshing with the gear of the corresponding axle, said gear housings being freely rotatable on the countershafts, a steering shaft, means for rotating the steering shaft, the ends of the steering shaft projecting into the gear boxes and the ends thereof provided with gears meshing with the gears at the upper ends of the stub shafts.

JULIAN R. ENOS.

REFERENCES CITED

The following references are of record in the file of this patent:

UNITED STATES PATENTS

| Number | Name | Date |
|---|---|---|
| 1,008,376 | Siders et al. | Nov. 14, 1911 |
| 1,102,636 | Barnes | July 7, 1914 |
| 1,420,387 | Schaefer | June 20, 1922 |
| 2,376,419 | Cole | May 22, 1945 |

FOREIGN PATENTS

| Number | Country | Date |
|---|---|---|
| 709,375 | France | May 18, 1931 |